United States Patent Office 3,343,346
Patented Sept. 26, 1967

3,343,346
APPLIANCES FOR THE REMOVAL OF DUST OR PURIFICATION BY WET PROCESS OR WASHING OF A GASEOUS STREAM
Yvon Broyard, 2 Place Exeter, Montdidier, Somme, France
Filed Oct. 3, 1963, Ser. No. 313,494
2 Claims. (Cl. 55—413)

ABSTRACT OF THE DISCLOSURE

The present invention relates to appliances for the removal of dust or purification by wet process or washing of a gaseous stream, and more especially those appliances in which the gaseous stream under treatment is formed in a vortex which flows about the axis of said stream and is charged with liquid particles, and penetrates in this form through a circular orifice inside a chamber known as a "vortex unwinding chamber" from which the gaseous stream passes out tangentially so as to flow into the interior of a tank forming a body of revolution, against the wall of which the said liquid particles are thus centrifugalized and consequently freed from the gaseous stream which passes out through an orifice at that portion of the tank which is located at a distance away from the point of entry of said stream, while the separated particles are withdrawn at the bottom of the apparatus.

---

The present invention has for its object to improve this category of appliances, especially with a view to reducing the pressure loss incurred by the stream as this latter flows through the apparatus. Furthermore, it does happen in appliances of known type that there takes place a re-entrainment of the particles which had been removed by centrifugal action in the delivery tank and which are thus carried away by the stream outside the said tank; the present invention also has for its object to improve said appliances in this respect in order to prevent the occurrence of the said re-entrainment process.

In order to achieve among others the results which have been mentioned above, the present invention includes within its scope a certain number of improvements which are preferably employed in combination since the apparatus then affords the maximum number of advantages, but which can also be employed independently of each other without thereby departing from the scope of the invention.

One of the aforesaid improvements consists in the fact that, the tank or body of revolution which separates the particles being constituted by a frusto-conical cyclone, this latter is reversed, that is to say, the small base of the cyclone is disposed at the top. This arrangement in itself already effectively prevents the entrainment of particles which are separated by centrifugal action inside the said tank; the arrangement is preferably completed, however, by a sleeve which is provided inside the cyclone and by means of which the circular orifice located at the top of the cyclone is extended into the interior of this latter, that is to say in a downward direction.

In a particular and preferred form of embodiment, the said vortex unwinding chamber is disposed at the bottom portion of the cyclone while the cylindrical inlet pipe through which the said vortical stream is admitted passes from end to end through the said cyclone along the axis of this latter.

A further improvement consists in the fact that the outlet orifice of the said vortex unwinding chamber is extended by a conduit substantially in the form of a spiral which recedes from the pole of the chamber. The conversion of energy which accordingly takes place at the centre of the stream as this latter flows through the said conduit is conducive to a reduction of the pressure loss through the apparatus. Preferably, the cross-section of the said spiral-shaped conduit is substantially constant, while the width thereof (as measured parallel to the axis of the chamber) progressively increases. In conformity with aero-dynamic laws of spiral flow patterns, this latter arrangement further accentuates the favorable effect of the previous arrangement. Whether in combination or not with this latter arrangement, it is preferable to ensure that the said outlet conduit of the unwinding chamber is so arranged as to open into the cyclone in such manner as to be substantially tangent to the wall of this latter, with a view also to reducing the pressure loss by means of a more uniform flow of the stream while avoiding any shock of this latter against the wall of the particle separator tank.

Again a further improvement consists in the fact that, at the outlet of the cyclone, the stream penetrates inside a chamber having a configuration in the form of a substantially logarithmic spiral, through the circular orifice of the said chamber. This last-mentioned arrangement is intended to produce the energy conversion of the stream, which also results in favorable effects, especially as regards reduction in loss of pressure.

In a particular form of embodiment, the spiral chamber which has just been referred to directly covers the small base of the cyclone and is fixed on the said small base. In the case in which the conduit through which the vortical stream is admitted passes through the cyclone, the said conduit through which the vortical stream is fed also passes axially from one end to the other through the said spiral chamber.

There has been illustrated in the accompanying drawing a form of embodiment of an apparatus for the removal of dust from gases, the improvements in accordance with the invention having been incorporated in the said apparatus.

In this drawing.

In this example of construction, the apparatus comprises an outer casing constituted by sections set one above the other which are each formed by a body of revolution, and these different elements of revolution are disposed co-axially and provided with external assembly flanges.

Figure 1:
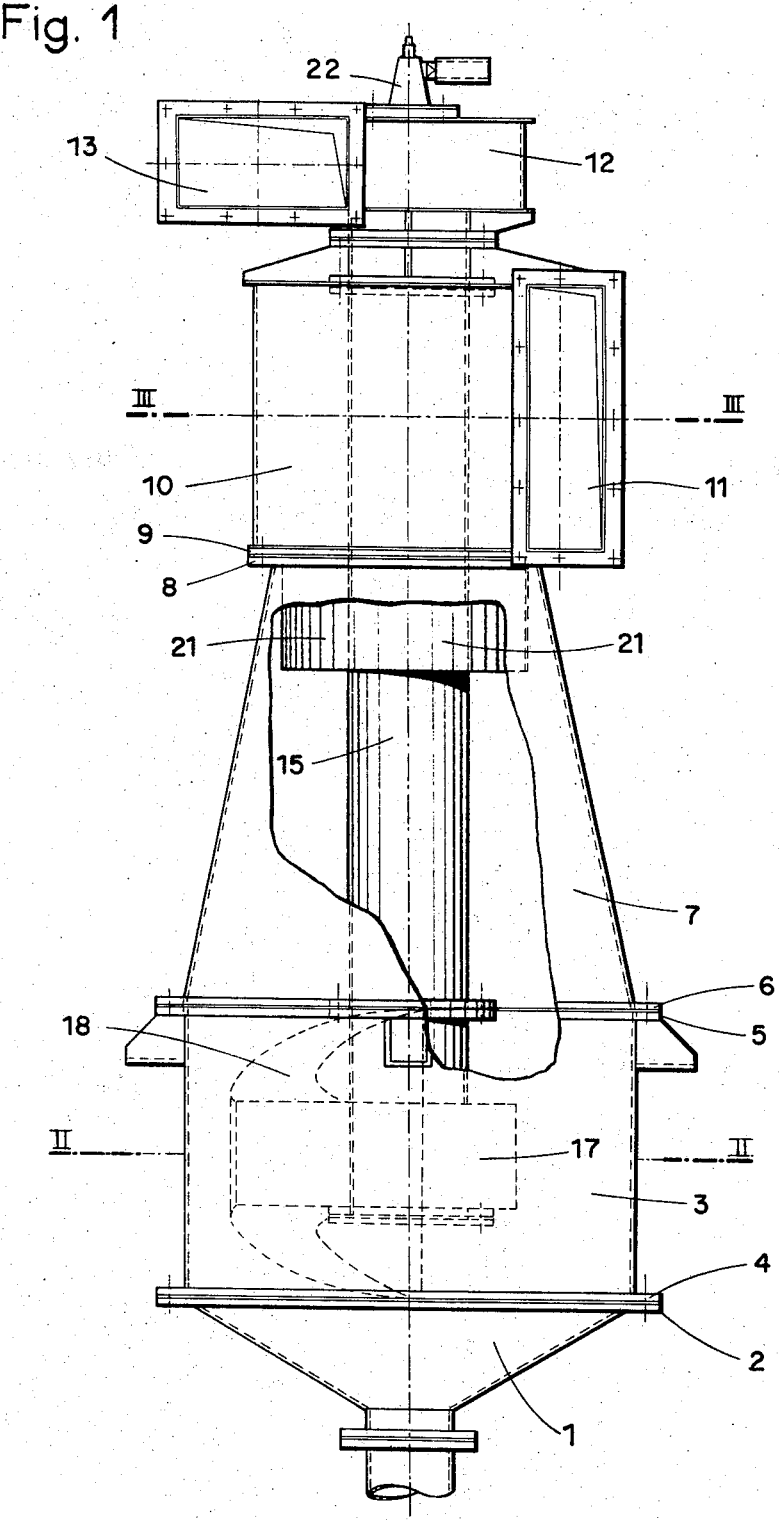
FIG. 1 is a view of the complete apparatus, taken in elevation with portions broken away.
Figure 2:
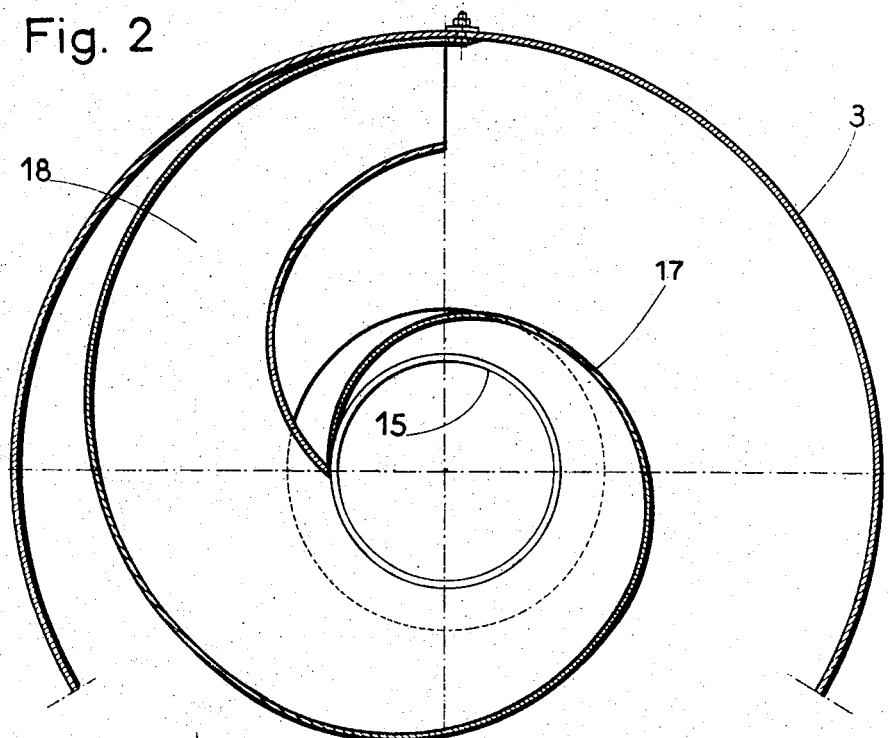
FIGS. 2 and 3 are respectively transverse cross-sections of the apparatus, taken along the lines which are designated by II—II and III—III in FIG. 1.
Figure 3:
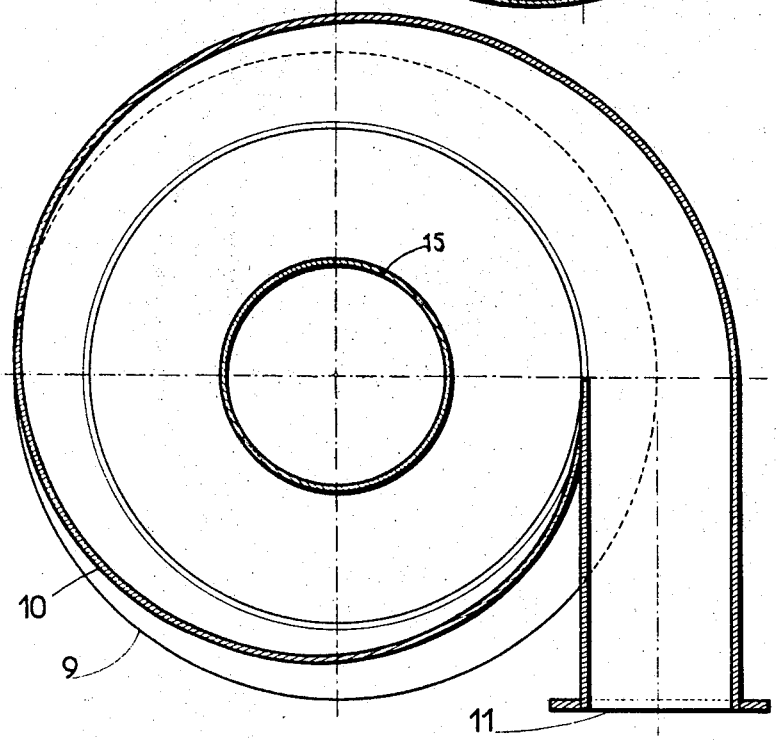

There can successively be found from the base upwards a bottom section 1 having the shape of a conical cup in the bottom of which is formed a central circular orifice; on the said bottom section, which is provided at the top portion thereof with an assembly flange 2, there rests a cylindrical section 3 which is provided at the opposite ends thereof with assembly flanges 4 and 5, the flange 4 being adapted to rest on the flange 2 and fixed thereon by means of bolts. The flange 6 is brought to bear on the flange 5 of the section 3 and is formed on the large base of a frusto-conical section 7, the top base of which is provided with a flange 8; on this latter is supported the bottom flange 9 of a chamber 10 having a cylindrical side-wall with a logarithmic director spiral. The bottom of the said chamber 10 is provided with a circular hole which is co-axial with the spiral and which puts the interior of the said chamber 10 into communication with the interior of the section 7. The said chamber 10 is provided over the full height thereof and at the extremity of the side-wall of the said chamber with a rectangular outlet orifice 11. The said chamber 10 in turn supports another cylindrical chamber 12 having a director-line in the form of a logarithmic spiral and which is provided with a tangential lateral orifice 13 for the admission of the gas stream to be treated. In that bottom portion of the said chamber 12 which rests on the chamber 10, there is formed a circular outlet orifice, the centre of which is in the axis of the spiral and the said orifice is extended downwards by a cylindrical tube 15 having the same diameter and co-axial with the apparatus. The said cylindrical tube 15 extends into the interior of the cylindrical tank 3 and then terminates inside this latter in another cylindrical chamber 17 having a director-line in the form of a logarithmic spiral and located in the interior of the said shell 3. The radius vectors of the director-spiral of the cylindrical side-wall of the said chamber 17 increase in a direction of rotation which is opposite to the direction of rotation of the increasing radius vectors of the admission chamber 12. Moreover, the axis of the said spiral coincides with the axis of the conduit 15. The said chamber 17 communicates with the interior of the tank 3 through a conduit 18 which comprises two cylindrical walls with generator-lines parallel to the axis of the apparatus and having as respective director-lines two curves as shown in plan in FIG. 2 which have approximately the shape of spirals or helices, while that curve which is most distant from the axis is substantially tangent to the wall of the tank 3; the generator-lines of the said two walls have lengths which progressively increase as they are located at a greater distance away from the axis so as to reach substantially the height of the tank 3 at the outlet extremity of the said conduit 18. As illustrated in FIG. 2, the duct 18 decreases in width transversely of the axis of conduct 15 and increases in height as the width decreases as shown in FIG. 1.

At the top end of the section 7 of the outer casing, there is fixed a cylindrical sleeve 21 having a diameter which is equal to that of the said top end and the said sleeve extends downwards inside the said section 7.

The stream of gas to be treated penetrates through the inlet orifice 13 inside the top chamber 12 which is fitted in a manner known per se with means 22 for spraying water or other treatment liquid and which are not described in greater detail since the said means do not form part of the present invention. The stream is charged inside the said chamber with atomized liquid particles and is made to flow, in a manner known per se, in the form of a vortex which passes out through the cylindrical conduit 15. At the bottom extremity of the said conduit, the stream penetrates inside the evolution chamber 17, in which the vortical motion of said stream about its own axis is transformed by evolution or unwinding, and from which the said stream passes out tangentially through the conduit 18 and extends in depth therein and flattens out so as to pass in the form of a thin sheet from the said conduit into the interior of the section 3. This latter forms with the section 7 the cyclone separator in which the said stream commences to flow in winding motion so as to form a new vortex and then pass out at the top extremity through the sleeve 21. In the interior of the said cyclone, the particles are powerfully centrifugalized against the wall along which they flow downwards whilst the newly formed vortex progressively moves away from the said wall as it flows upwards so as to penetrate inside the sleeve 21. Re-entrainment of centrifugalized particles is thus prevented. The said particles run downwards along the side-wall of the cyclone and collect in the cup 1, then pass out of this latter through the bottom central orifice which is extended by an evacuation tube 23. The vortex which is thus newly formed penetrates through the sleeve 21 into the interior of the chamber 10 wherein the said vortex is unwound in its turn and flows out through the tangential outlet orifice 11.

It will be understood that the present invention is not in any sense limited to the constructional details which have been illustrated or described and which have been given solely by way of example.

What I claim is:

1. In an apparatus for treating a gaseous stream by wet process, including duct means adapted to be flown through by a stream of gas to be treated, said duct means including a stream inlet section shaped to provide for the formation of said gas into a free spiral vortex and having a circular outlet, a second section of circular cross-section extended downstream of said vortex forming section and connected to the outlet thereof, a third section connected to said second section to form an extension thereof and shaped to provide for unwinding of the free spiral vortex, said third section having a stream outlet and a discharge orifice for the escape of particles from said stream, a fourth section having an inlet connected to said stream outlet and being shaped to cause self-unwinding as a spiral vortex of the stream unwound in said third section, said fourth section having a circular outlet for said unwound stream and an outlet terminal section having a tangential outlet and a circular inlet connected to said circular outlet of the fourth section, said terminal section being shaped for final unwinding of said stream, said third section comprising a whirl unwinding duct means connected to the end of the second section to be entered by the whirl flowing through said second section and providing for an axifugal whirl unwinding flow of the stream whereby said whirl is turned into a much slowly rotating and relatively thin sheath within said third section and escaping therefrom into the fourth section and said duct means including two walls curved around and parallel to the axis of the whirl flowing from the second section into said duct means, the wall curvature being in accordance with a logarithmic spiral pattern.

2. An apparatus as in claim 1, wherein the cross-section of said duct means is rectangular and of substantially constant area along the duct with a decreasing width transversally of said axis and an increasing dimension parallely thereto.

References Cited

UNITED STATES PATENTS

| 1,952,308 | 3/1934 | Bowen | 55—236 |
| 3,031,825 | 5/1962 | De La Fourniere | 55—236 |

FOREIGN PATENTS

| 506,778 | 6/1939 | Great Britain. |
| 542,063 | 12/1941 | Great Britain. |

HARRY B. THORNTON, *Primary Examiner.*

ROBERT F. BURNETT, *Examiner.*

D. DENENBERG, D. TALBERT, *Assistant Examiners.*